United States Patent
Perreault et al.

(10) Patent No.: US 10,787,374 B2
(45) Date of Patent: Sep. 29, 2020

(54) SILVER-IMPREGNATED TWO-DIMENSIONAL STRUCTURES FOR BROMIDE REMOVAL

(71) Applicants: Francois Perreault, Tempe, AZ (US); Paul K. Westerhoff, Scottsdale, AZ (US); Onur Guven Apul, Lowell, MA (US); Shahnawaz Sinha, Chandler, AZ (US)

(72) Inventors: Francois Perreault, Tempe, AZ (US); Paul K. Westerhoff, Scottsdale, AZ (US); Onur Guven Apul, Lowell, MA (US); Shahnawaz Sinha, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 145 days.

(21) Appl. No.: 15/971,083

(22) Filed: May 4, 2018

(65) Prior Publication Data
US 2018/0319677 A1 Nov. 8, 2018

Related U.S. Application Data

(60) Provisional application No. 62/501,380, filed on May 4, 2017.

(51) Int. Cl.
*B01J 20/20* (2006.01)
*B01J 20/32* (2006.01)
(Continued)

(52) U.S. Cl.
CPC .............. *C02F 1/288* (2013.01); *B01J 20/20* (2013.01); *B01J 20/3225* (2013.01);
(Continued)

(58) Field of Classification Search
CPC .... C02F 1/288; C02F 1/5245; C02F 2101/12; C02F 2103/007; C02F 2103/06;
(Continued)

(56) References Cited

U.S. PATENT DOCUMENTS 6,071,415 A    6/2000  Frommer et al.
9,242,231 B2 * 1/2016  Tenne .................... B01J 27/049
(Continued)

OTHER PUBLICATIONS

Yuan, W., et al., "Green synthesis of graphene/Ag nanoconnposites", Applied Surface Science, 261, pp. 753-758. (Year: 2012).*
(Continued)

*Primary Examiner* — Benjamin L Lebron
(74) *Attorney, Agent, or Firm* — Fish & Richardson P.C.

(57) ABSTRACT

Compositions for bromide removal include a two-dimensional material impregnated with silver. The silver may be impregnated in the two-dimensional material by contacting the two-dimensional material with silver ions in an aqueous solution, allowing the silver ions to adsorb on the two-dimensional material, and drying the two-dimensional material. Removing bromide from an aqueous composition including bromide may include contacting the aqueous composition with a two-dimensional material impregnated with silver, and allowing the bromide to react with the silver to yield silver bromide.

10 Claims, 6 Drawing Sheets

(51) Int. Cl.
  *C02F 1/28* (2006.01)
  *C02F 1/52* (2006.01)
  *B01D 61/14* (2006.01)
  *C02F 103/00* (2006.01)
  *C02F 103/06* (2006.01)
  *C02F 103/08* (2006.01)
  *C02F 101/12* (2006.01)

(52) U.S. Cl.
  CPC ........... *B01J 20/3236* (2013.01); *B01D 61/14* (2013.01); *C02F 1/5245* (2013.01); *C02F 2101/12* (2013.01); *C02F 2103/007* (2013.01); *C02F 2103/06* (2013.01); *C02F 2103/08* (2013.01); *C02F 2305/08* (2013.01)

(58) Field of Classification Search
  CPC ... C02F 2103/08; C02F 2305/08; B01J 20/20; B01J 20/3225; B01J 20/3236; B01D 61/14
  See application file for complete search history.

(56) References Cited

U.S. PATENT DOCUMENTS

| | | | |
|---|---|---|---|
| 2013/0240439 | A1 | 9/2013 | Pradeep et al. |
| 2015/0129502 | A1 | 5/2015 | Meng et al. |
| 2016/0361714 | A1* | 12/2016 | Chiang .................. B01J 21/18 |
| 2017/0296972 | A1* | 10/2017 | Sinton .................. B01D 71/021 |

OTHER PUBLICATIONS

Apul et al. "Adsorption of aromatic organic contaminants by graphene nanosheets: Comparison with carbon nanotubes and activated carbon". Water Research, 47(4):1648-1654. (2013).

Chen etl al. "Removal of bromide from surface waters using silver impregnated activated carbon". Water Research, DOI: 10.1016/j.watres.2017.01.019. pp. 223-230, Apr. 15, 2017.

Davis et al. "Uses of chloride/bromide ratios in studies of potable water". Ground Water, 36 (2), 338-350. Mar. 1998.

Gong et al. ""Removal of bromide from water by adsorption on silver-loaded porous carbon spheres to prevent bromate formation"". Chemical Engineering Journal 218, 333-340. (2013).

Katz et al. ""Using Cl/Br ratios and other indicators to assess potential impacts on groundwater quality from septic systems: a review and examples from principal aquifers in the United States"". Journal of Hydrology, 397 (3), 151-166. (2011).

Marcano et al. "Improved Synthesis of Graphene Oxide". ACS Nano, 4 (8), pp. 4806-4814. (2010).

Mullaney et al. ""Chloride in groundwater and surface water in areas underlain by the glacial aquifer system, northern United States"". U.S. Geological Survey Scientific Investigations Report 2009-5086,41 p. (2009).

Sanchez-Polo et al. ""Metal-doped carbon aerogels. New materials for water treatments"". Industrial & Engineering Chemistry Research 47(16), 6001-6005. (2008).

Sanchez-Polo et al. "Removal of bromide and iodide anions from drinking water by silver-activated carbon aerogels". Journal of Colloid and Interface Science 300(1), 437-441. (2006).

Tung et al. "High-Throughput Solution Processing of Large-Scale Graphene". Nat. Nanotechnol 2009, 4, 25-29. (2009).

Watson et al. "Comparing a silver-impregnated activated carbon with an unmodified activated carbon for disinfection by-product minimisation and precursor removal". Science of the Total Environment 542, 672-684. (2016).

Chang, et al, "Antimicrobial behavior comparison and antimicrobial mechanism of silver coated carbon nanocomposites", Process Safety and Environmental Protection, 102, 2016, pp. 596-605 <DOI:10.1016/j.osep.2016.05.023>. 10 pages. Jul. 2016.

Chen, "Bromide Removal from Surface Waters by Silver Impregnated Activated Carbon", TigerPrints (Clemson University), Master's Thesis, 2015, Paper 2024. pp. 1-89.

\* cited by examiner

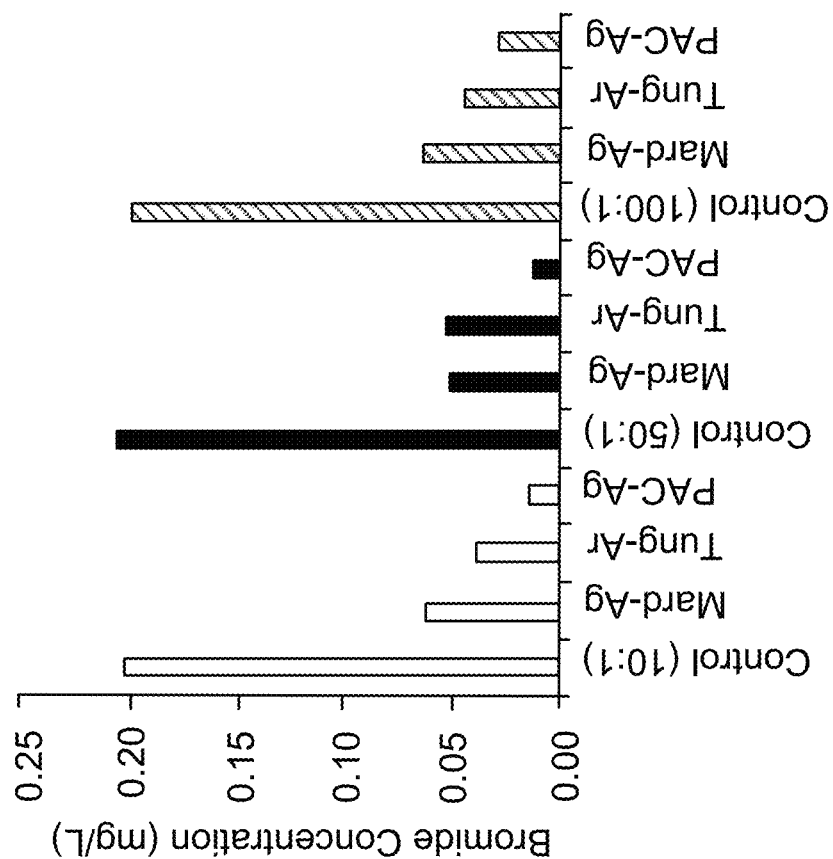
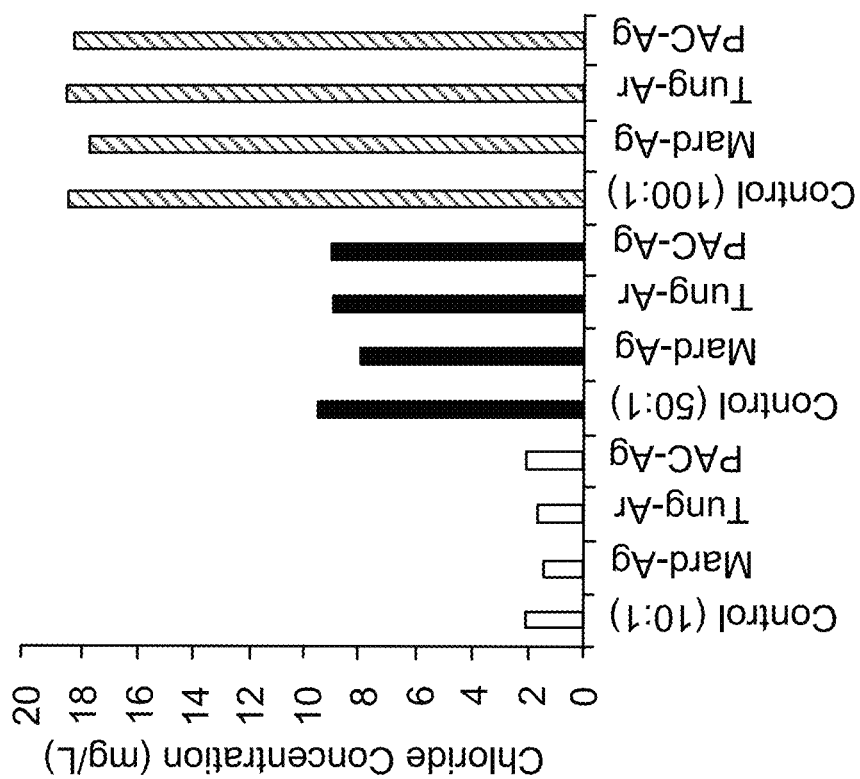
FIG. 4A
FIG. 4B

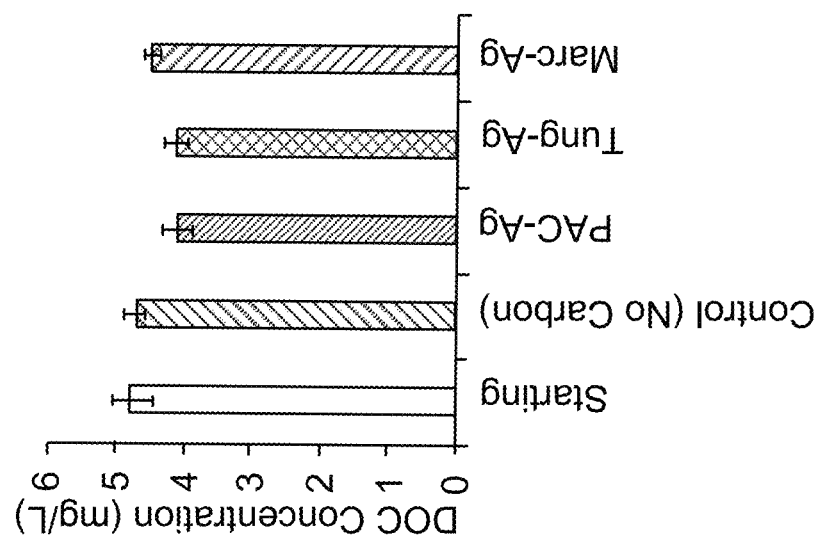
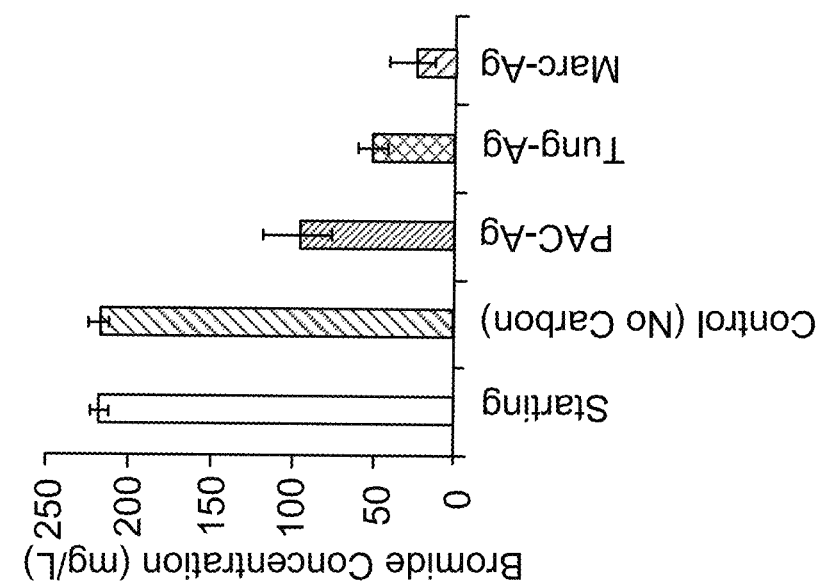
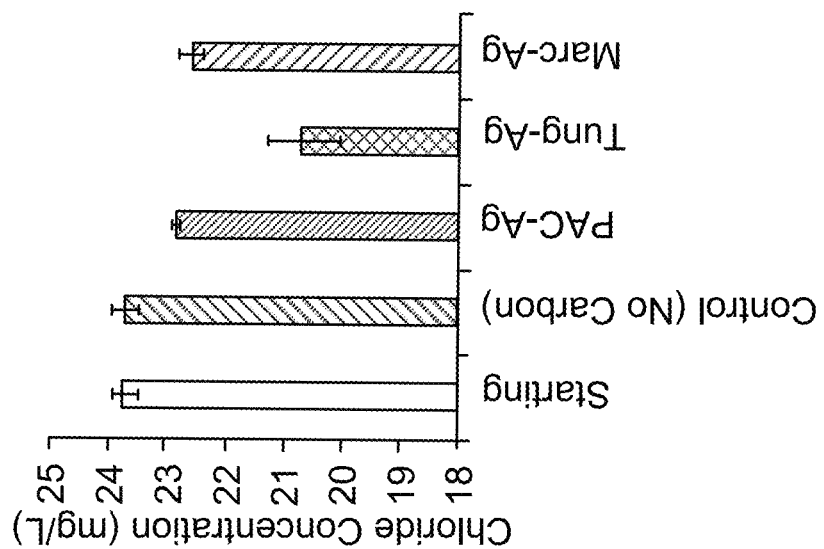
FIG. 5A
FIG. 5B
FIG. 5C

SILVER-IMPREGNATED TWO-DIMENSIONAL STRUCTURES FOR BROMIDE REMOVAL

CROSS-REFERENCE TO RELATED APPLICATION

This application claims the benefit of U.S. Application No. 62/501,380 entitled "SILVER-IMPREGNATED TWO-DIMENSIONAL STRUCTURES FOR BROMIDE REMOVAL" and filed on May 4, 2017, which is incorporated herein by reference in its entirety.

STATEMENT OF GOVERNMENT INTEREST

This invention was made with government support under 1449500 awarded by the National Science Foundation. The government has certain rights in the invention.

TECHNICAL FIELD

This invention relates to silver-impregnated two-dimensional structures for bromine removal from water.

BACKGROUND

Bromide is a halogen and an anion in water (Br). It is widely present in natural waters (e.g., surface, groundwater, seawater, etc.). It can also originate from industrial, mining and human activities. Its concentration typically ranges between 14-200 ug/L in US waters. It is generally harmless at such levels; however, it is considered to be an inorganic precursor in forming various types of disinfection by-products (DBPs) even at such levels, primarily in the presence of oxidants and natural organic matter (NOM) (i.e., Br+oxidants+NOM=DBPs). DBPs are regulated by the United States Environmental Protection Agency for drinking water at low levels (parts per billion (ppb)).

In the presence of oxidants, such as ozone ($O_3$) during water disinfection and oxidation processes, bromide reacts with ozone to form bromine and hypobromous acid (HOBr), which then reacts with organic matter to form brominated by-products (DBPs), such as bromate ($BrO_3^-$). Bromate is highly toxic and is regulated at maximum contamination level (MCLs) of 10 ppb. Bromide can also react with commonly used disinfectants, such as chlorine or hypochlorous acid HOCl in forming HOBr. Both oxidants, i.e., HOCl and HOBr, react with natural organic matter (NOM) to form chlorinated and brominated and other halogenated DBPs, such as trihalomethanes (THMs) and haloacetic acids (HAAs). These carcinogenic by-products are regulated at 80 ppb and 60 ppb, respectively.

These halogenated by-products are toxic and carcinogenic. However, brominated by-products are known to be more toxic than chlorinated species. Disinfection is an important step in both water and wastewater treatment to ensure the required water quality for safe drinking water and discharges, respectively. Several techniques are available in minimizing the overall disinfection by-products (DBPs) formation during water treatment. Among them, the most commonly used method is to maximize the organic precursor removal (e.g., DOC, NOM) from the water. Once removed, overall DBP formation is reduced. Although removal of the inorganic precursor (bromide) would also contribute to a reduction of DBP formation, bromide is more difficult and more expensive to remove, due at least in part to its lower concentration (ppb) than that of organic matter (parts per million (ppm)) and the presence of competitive co-occurring ions (e.g., chloride, sulfate) and compounds (e.g., organic matter) that hinder selective bromide removal.

In water, silver ions (AO can react with bromide to form insoluble precipitates ($Ag^+ + Br^- \rightarrow AgBr(s)$, $K_{sp}=5.2\times10^{-13}$). The high affinity of silver with bromide has been used to develop materials able to remove bromide by precipitating it as AgBr out of solution. For example, silver-impregnated activated carbons have been proposed as a selective bromide removal sorbent. However, using activated carbon as a support for silver can reduce the overall performance of the sorbent for bromide removal. The porous structure of activated carbon, which has high affinity for organic matter, can easily be blocked in complex water matrices, which will decrease the availability of the silver content for bromide interactions. The high tortuosity of activated carbon may also limit the kinetics of bromide diffusion and its reaction with silver. Finally, competing anions in water also reduce the availability of silver for bromide interactions. Chloride, which is abundant in natural waters, can react with silver ($Ag^+ + Cl^- \rightarrow AgCl(s)$, $K_{sp}=2.8\times10^{-10}$) instead of bromide to preferentially form silver chloride rather silver bromide. While the solubility constant of AgCl is three order of magnitudes lower than the solubility constant of AgBr, the mass ratio of chloride ($Cl^-$) to bromide ($Br^-$) in many drinking water is orders of magnitude higher (approximately 300:1), which may favor the formation of AgCl over AgBr. At higher chloride concentrations, such as in seawater (700:1 molar ratio), competing anions pose even more challenges to remove the bromide from water.

SUMMARY

Silver-impregnated two-dimensional materials, such as graphene and graphene oxide, are described. These materials allow selective removal of bromide from water in the presence of organics and other anions without interfering with other processes. The open structure of the materials facilitates the interaction of silver with bromide, increasing the silver use efficiency and decreasing competition with co-occurring anions and organic compounds. The materials can be used to reduce inorganic precursors of disinfection by-products formation, and then removed from an aqueous environment with settling or flotation or separated using high throughput filtration.

In a first general aspect, a composition includes a two-dimensional material and silver impregnated in the two-dimensional material.

In a second general aspect, impregnating a two-dimensional material with silver includes contacting a two-dimensional material with silver ions in an aqueous solution, allowing the silver ions to adsorb on the two-dimensional material, and drying the two-dimensional material.

In a third general aspect, removing bromide from an aqueous composition includes contacting an aqueous composition including bromide with a two-dimensional material impregnated with silver, and allowing the bromide to react with the silver to yield silver bromide.

Implementations of the first, second, and third general aspect may include one or more of the following features.

Two dimensional material may include graphene, graphene oxide, molybdenum disulfide, or a combination thereof. The silver may be in the form of silver ions adsorbed on the two-dimensional material or in the form of silver nanoparticles. The silver nanoparticles have a maximum dimension of 100 nm or less or 50 nm or less (e.g., 2 nm to 50 nm). The nanoparticles may be formed directly on the two-dimensional material. The silver-impregnated two-dimensional material may include 0.1 wt % to 15 wt % silver (e.g., 0.1 wt % to 5 wt % silver, or about 1 wt % silver)

Implementations of the second general aspect may include one or more of the following features.

Impregnating the two-dimensional material with silver may include reducing the silver ions adsorbed on the two-dimensional material to form silver nanoparticles on the two dimensional material before drying the two-dimensional material.

Implementations of the third general aspect may include one or more of the following features.

Contacting the aqueous composition with the two-dimensional material may include immersing the two-dimensional material in the aqueous composition. Removing bromide from an aqueous composition may further include removing the two-dimensional material from the aqueous composition. The silver bromide is in direct contact with the two-dimensional material. The aqueous composition comprises may include organic matter. The aqueous composition may include at least one of surface, groundwater, river water, and seawater.

BRIEF DESCRIPTION OF THE DRAWINGS

FIGS. 4A and 4B show residual chloride and bromide concentrations, respectively, after treatment with silver-impregnated graphene oxide and their corresponding precursor (unimpregnated) materials in nanopure water.

FIGS. 5A-5C show residual chloride, bromide, and dissolved organic carbon, respectively, after treatment.

DETAILED DESCRIPTION

Impregnation of two-dimensional (2D) materials with silver and the resulting silver-impregnated 2D materials are described. The silver-impregnated 2D materials are suitable for bromide removal from water. Examples of suitable 2D materials include graphene, graphene oxide, and molybdenum disulfide. The open structure of the 2D materials reduces interference of the water matrix and makes the silver more available to interact with bromide.

Figure 1:
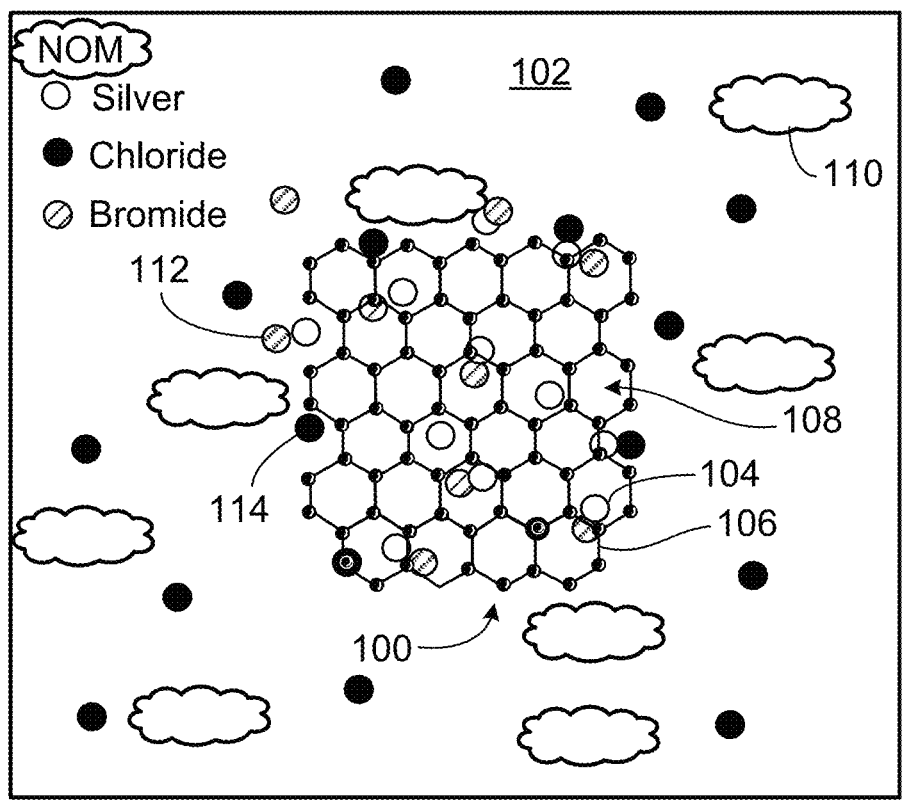
FIG. 1 depicts a silver-impregnated two-dimensional material.

FIG. 1 depicts silver-impregnated 2D material 100 in water matrix 102, with silver particles 104 coupled to 2D material 106 defining openings 108. Suitable examples of 2D material 106 include graphene, graphene oxide, and molybdenum disulfide. 2D material 106 may be a monolayer, or may include two or more layers (e.g., two to five layers or two to six layers). Water matrix 102 may include natural organic matter (NOM) 110. As depicted, silver particles 104 may be in direct contact with or directly attached to 2D material 106. In some instances, silver particles 104 are formed directly (e.g., nucleated) on 2D material 106. Silver particles 104 may be silver nanoparticles. In some examples, the nanoparticles have a dimension between 1 nm and 100 nm, or between 1 nm and 50 nm. The use of silver particles 104 increases the availability of silver for bromide interaction and increases the efficacy of the silver (e.g., the amount of bromide removed per unit of silver present) compared to silver ions adsorbed on 2D material 106.

The high surface area of 2D material 106 and the spatial relationship of silver particles 104 with respect to openings 108 facilitates interaction of the silver particles with ions, such as bromide 112 and chloride 114 in water matrix 102. The open structure of the 2D materials makes the silver more available for bromide interaction in the presence of competing ions and interfering compounds such as NOM 110. NOM 110 is typically too large to enter openings 108 of 2D material 106, and therefore has little impact on the efficacy of bromide removal with silver-impregnated 2D material 100.

Silver-impregnated 2D material 100 is suitable for use in the removal of bromide from a water matrix before, during, or after coagulation in a water treatment process. In some examples, the silver content of the silver-impregnated 2D material is in a range between 0.1 wt % and 15 wt % (e.g., between 1 wt % and 5 wt %, or about 1 wt %). The silver-impregnated 2D materials may also be applied as a slurry (e.g., in a slurry bed reactor) to remove bromide ions. Once bromide is removed by the formation of insoluble AgBr, the AgBr can be settled in settling basin, floated up by dissolved air flotation (DAF), or separated by high throughput membrane filtration (e.g., with non-polymeric membranes, such as ceramic micro- and ultrafiltration membranes).

Figure 2:
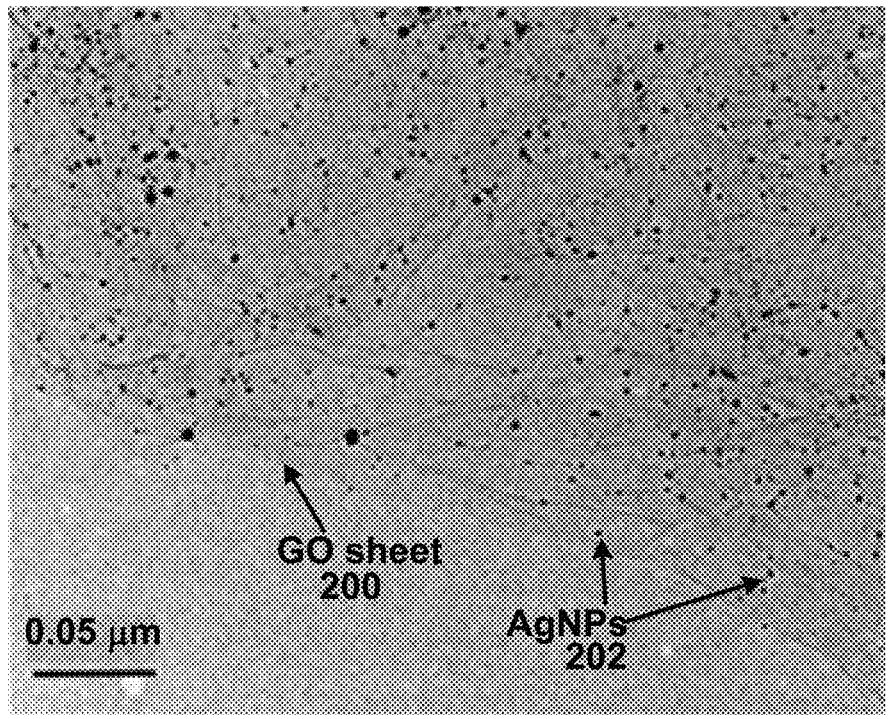
FIG. 2 is a transmission electron micrograph showing silver particles formed on graphene oxide sheets.

Graphene oxide (GO), a sheet-like structure of oxidized aromatic carbon sheets, can be obtained by chemical oxidation of graphite to GO. GO can serve as a scaffold for silver impregnation due at least in part to its open structure and its abundance of oxygen functional groups, which can be used to grow silver nanoparticles directly on the GO surface. Silver-impregnated GO can be formed by combining GO with a silver nitrate solution, and reducing silver ions in solution to silver on the GO. The silver-impregnated GO can be collected by centrifugation. FIG. 2 is a transmission electron micrograph showing GO 200 with impregnated silver particles 202 formed by this process.

Examples

To make GO impregnated with silver (Ag) nanoparticles, several commercially available chemicals were secured. These include graphite for GO synthesis, silver nitrate ($AgNO_3$) for silver impregnation, and sodium borohydride ($NaBH_4$) as a reducing agent for silver nanoparticle formation. Impregnation of GO with silver nanoparticles was done by adding 0.2 g of GO to 10 mL of 0.01 M $AgNO_3$ under continuous agitation. The reducing agent, $NaBH_4$ (from 0.2 to 0.025 M) was added dropwise to reduce silver to silver nanoparticles on the GO. This procedure yields a high loading of small silver nanoparticles on the GO sheet. The nanoparticles typically have a dimension between 2 nm and 50 nm (e.g., between 2 nm and 15 nm, or about 10 nm). The silver impregnated GO was collected by centrifugation at 12,000 G for 30 min, dialyzed for 3 hours, and lyophilized until dry.

For comparison, GO was impregnated with silver ions by adding 0.2 g of GO to 10 mL of 0.5 M $AgNO_3$ or 0.01 M AgNO$_3$, and the carbon slurry was then stirred for two days at 150 rpm at room temperature (20±3° C.). Then, the carbon sample was centrifuged for 30 minutes at 12,000 G rotation. The silver-impregnated GO was collected by centrifugation at 12,000 G for 30 min, dialyzed for 3 hours, and lyophilized until dry. For comparison, impregnation of commercial powdered activated carbon (PAC) by silver ions was done in the same procedure as for GO samples.

Different types of graphene oxide were synthesized. "Marc GO" and "Tung GO" refer to graphene oxide prepared by synthesis reactions described in Marcano et al., Improved Synthesis of Graphene Oxide, ACS Nano 2010, 4 (8), pp. 4806-4814 and Tung et al., High-Throughput Solution Processing of Large-Scale Graphene, Nat. Nanotechnol. 2009, 4, 25-29, respectively, which are both incorporated by reference herein.

All materials were characterized before and after silver impregnation by Raman spectroscopy and scanning electron microscopy. The silver content of each material was quantified by Inductively Coupled Plasma Mass spectrometry (ICP-MS) after digestion of the sample in nitric acid.

The capacity of the different materials for bromide removal was assessed using deionized (DI) water spiked with different constituents. Studies were conducted in completely mixed batch reactors (CMBRs, 125 mL plastic batch bottles) on an orbital shaker for four (4) hours to mimic water treatment conditions in drinking water treatment plants. The experimental volume was 100 mL with bromide was spiked to 200 µg/L, chloride (where applicable, as competitive anions) was spiked to 20 mg/L, and NOM (where applicable, as competitive adsorbate) was spiked to 5 mg DOC/L.

Bromide was spiked by a bromide stock solution (20 mg/L) prepared by dissolving reagent grade (99.0%) sodium bromide (NaBr) salt (Sigma-Aldrich) in 200 mL deionized water. Desired concentrations were obtained by diluting the bromide stock solution. The chloride stock solution (200 mg/L) was prepared by dissolving reagent grade (99.0%) sodium chloride (NaCl) salt (Sigma-Aldrich) in 100 mL deionized water and desired concentrations were obtained by diluting the chloride stock solution. The NOM isolate was purchased (as Suwannee River humic acids). The effects of NOM on bromide removal without other background-ion interferences were carefully studied at lab scale.

After the experiments, the samples were analyzed for UV254 (UV-Vis Spectroscopy, Info) and DOC (SEC-DOC, Info) before syringe filtration. The samples were filtered through 0.2 micron syringe filters to remove excess organics and carbon sorbents. The filters were air-dried and SEM/EDX imaging for characterization by taking the carbon sorbents trapped on the filters. The filtered solution was analyzed using ion chromatography (IC, INFO) to measure bromide and chloride concentrations.

Figure 3:
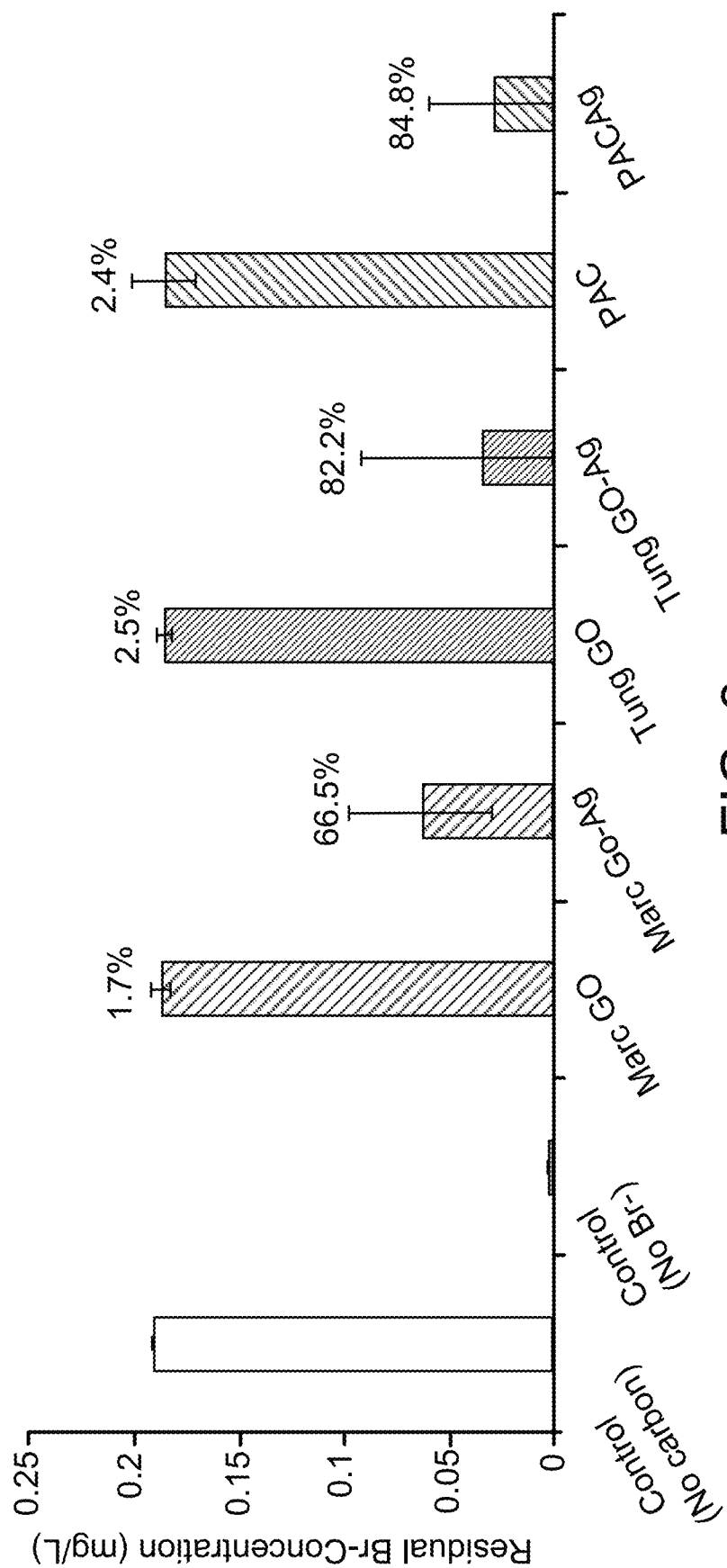
FIG. 3 shows residual bromide concentrations after treatment with silver-impregnated graphene oxide and powdered activated carbon and their corresponding precursor (unimpregnated) materials in nanopure water.

FIG. 3 shows residual bromide concentrations in bromide-spiked water after treatment of the water with silver-impregnated GO (Marc GO-Ag and Tung GO-Ag) and powdered activated carbon (PAC Ag) and their corresponding precursor (silver-free) materials (Marc GO, Tung GO, and PAC) in nanopure water. The PAC and GO in this experiment were impregnated with silver by soaking in a 0.5 M silver nitrate solution. Initial bromine concentration was set to 200 ppb for all samples, and the dose of 2D material was 25 mg/L. After treatment with silver impregnated GO or PAC, residual bromide levels decreased by 60-85%, while the silver-free material removed less than 3% of the bromide present. Numbers above the bars show the percentage of bromine removal: 1.7% for Marc GO, 66.5% for Marc GO-Ag, 2.5% for Tung GO, 82.2% for Tung GO-Ag, 2.4% for PAC, and 84.8% for PAC GO. Error bars show standard deviation of triplicate experiments.

FIGS. 4A and 4B show the results of experiments demonstrating the ability of various materials to remove bromide in the presence of chloride at different Cl/Br ratios. Bromide removal occurred in the presence of chloride. Chloride is a minimal competitor for bromide removal by both GO-Ag and PAC-Ag, even though more mass of chloride is removed than mass of bromide. Some chloride is removed, but a a larger percentage of bromide is removed compared to the percentage of chloride. There is minimal impact on bromide removal efficiency when the chloride:bromide ratio is altered or increased.

FIGS. 5A-5C show the results of experiments to test the ability of GO-Ag and PAC-Ag to remove bromide in water containing dissolved organic carbon (DOC). Residual chloride, bromide, and DOC concentrations were measured after treatment with silver-impregnated graphene oxide (25 mg/L and 4 hour contact time before 2 µm filtration). Initial conditions were chloride (20 mg/L), bromide (200 µg/L) and DOC (5 mg/L). Addition of DOC reduced the ability of PAC-Ag compared to that of Tung-Ag and Marc-Ag to remove bromide from water.

Figure 6:
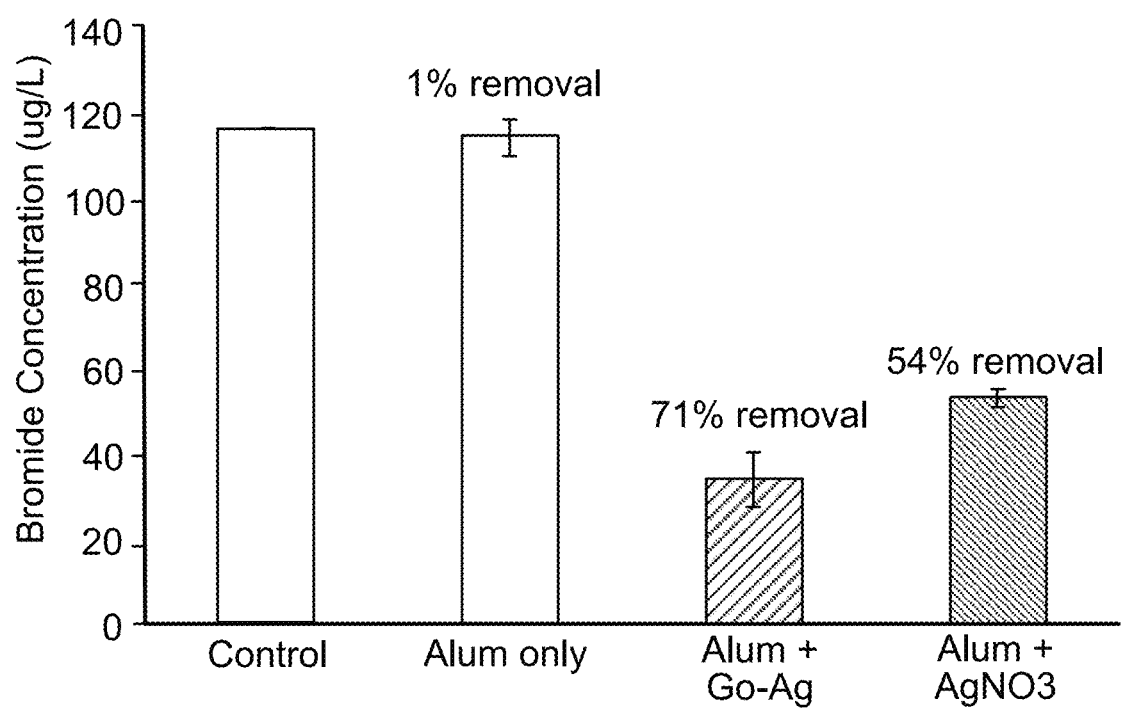
FIG. 6 shows residual bromide in water obtained from the Central Arizona Project after treatment.

FIG. 6 shows residual bromide in water obtained from the Central Arizona Project (CAP) after jar testing. The bromide concentration in the CAP water before alum coagulation was 119±16 ppb. In assessing the effectiveness of alum (28 mg/L), alum with 25 mg/L adsorbent (i.e., graphene oxide impregnated with silver) was added. All jars filled with 1-L source water were initially mixed for 6 minutes at 200 rpm to simulate coagulation (i.e., rapid mixing). The mixing speed was later decreased to 25 rpm for 20 minutes to simulate flocculation (i.e., slow mixing). In the last stage, mixing stopped and the flocs were allowed to settle out (i.e., sedimentation).

No additives were used during the slow mixing and sedimentation steps. An aliquot was withdrawn from the upper midpoint of the jar using a 50-mL plastic syringe without upsetting the sediment. With the addition of alum only, 1% of bromide was removed. With the addition of alum and GO-Ag, 71% of bromide was removed. With the addition of alum and silver nitrate, 54% of bromide was removed.

Figure 7:
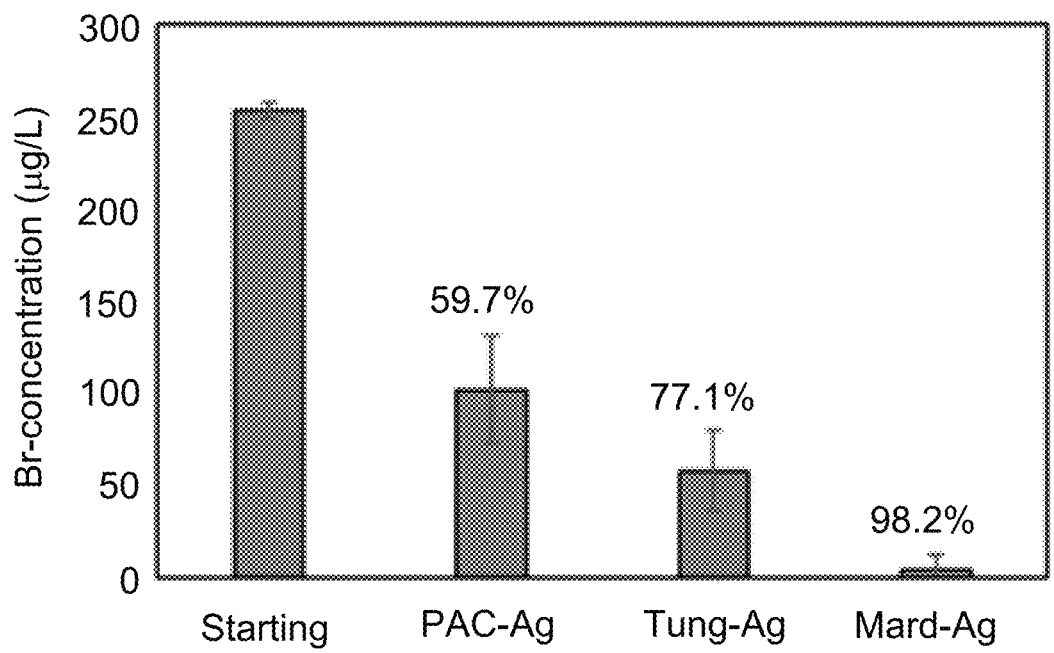
FIG. 7 shows residual bromide concentrations after treatment with different types of silver-impregnated graphene oxide and powdered activated carbon.

FIG. 7 shows the residual bromide level and bromide removal after treatment with GO and PAC impregnated with silver nitrate. The starting solution was deionized (DI) water with presence of 10 mg/L natural organic matter (NOM) and 250 µg/L bromide. A total mass of 25 mg/L of silver-impregnated material was added to each solution for bromide removal. Bromide removal was reduced by the presence of NOM for the porous PAC material, while the more open 2D structure of Tung GO-Ag and Marc GO-Ag lessened the interference of NOM on bromide removal.

Figure 8:
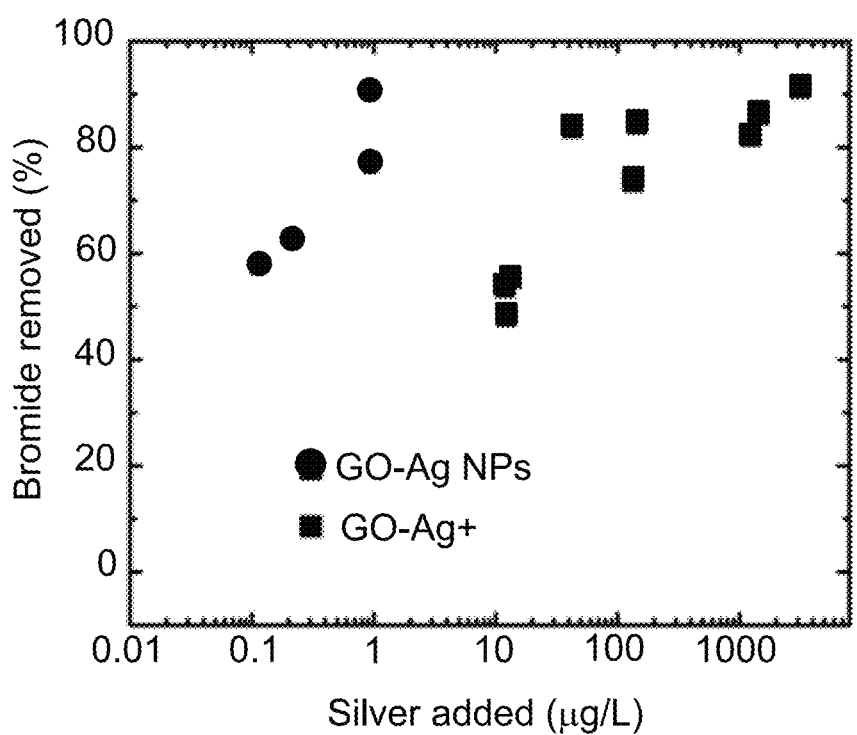
FIG. 8 shows a relationship between the amount of silver added and bromide removal for different nanocomposites.

FIG. 8 shows a relationship between the amount of silver added and bromide removal for different nanocomposites produced. The GO impregnated with silver nanoparticles with a dimension of about 10 nm (by the addition of NaBH$_4$) removed more bromide per amount of silver added than silver adsorbed in the form of silver ions. The impregnation of the materials with silver nanoparticles (circles) shows higher removal at lower silver content than materials impregnated with silver ions (squares) using silver nitrate soaking. Different types of GO materials, prepared by different GO syntheses, were compared to assess the effect of the GO structure on the silver loading and bromide removal efficiency. Thus, nucleation of silver to silver particles allows for a more efficient use of silver to remove bromide.

Only a few implementations are described and illustrated. Variations, enhancements and improvements of the described implementations and other implementations can be made based on what is described and illustrated in this document.

What is claimed is:

1. An aqueous mixture comprising:
    natural organic matter;
    bromide ions;
    graphene oxide;
    silver nanoparticles directly attached to the graphene oxide; and
    silver bromide,
    wherein the silver bromide is formed by reaction of the bromide ions and silver in the silver nanoparticles.

2. The composition of claim 1, wherein the silver nanoparticles have a maximum dimension of 100 nm or less.

3. The composition of claim 2, wherein the nanoparticles have a maximum dimension of 50 nm or less.

4. The composition of claim 1, wherein the nanoparticles are formed directly on the graphene oxide.

5. The composition of claim 1, wherein the silver nanoparticles comprise 0.1 wt % to 15 wt % of a total weight of the graphene oxide and the silver nanoparticles.

6. The composition of claim 5, wherein the silver nanoparticles comprise 1 wt % to 5 wt % of the total weight of the graphene oxide and the silver nanoparticles.

7. A method of removing bromide from an aqueous mixture, the method comprising:
    contacting an aqueous mixture comprising natural organic material and bromide ions with graphene oxide, wherein silver nanoparticles are directly attached to the graphene oxide; and
    allowing the bromide ions to react with the silver in the silver nanoparticles to yield silver bromide.

8. The method of claim 7, wherein contacting the aqueous mixture with the graphene oxide comprises immersing the graphene oxide in the aqueous mixture.

9. The method of claim 7, further comprising removing the graphene oxide from the aqueous mixture.

10. The method of claim 7, wherein the aqueous mixture comprises at least one of surface, groundwater, river water, and seawater.

* * * * *

UNITED STATES PATENT AND TRADEMARK OFFICE
CERTIFICATE OF CORRECTION

PATENT NO. : 10,787,374 B2  
APPLICATION NO. : 15/971083  
DATED : September 29, 2020  
INVENTOR(S) : Francois Perreault et al.

Page 1 of 1

It is certified that error appears in the above-identified patent and that said Letters Patent is hereby corrected as shown below:

On the Title Page

Column 2, Item (56) OTHER PUBLICATIONS, Line 1, delete "nanoconnposites"," and insert -- nanocomposites", --, therefor.

In the Claims

Claim 2, Column 7, Line 18, delete "composition" and insert -- aqueous mixture --, therefor.

Claim 3, Column 7, Line 20, delete "composition" and insert -- aqueous mixture --, therefor.

Claim 4, Column 7, Line 22, delete "composition" and insert -- aqueous mixture --, therefor.

Claim 5, Column 8, Line 1, delete "composition" and insert -- aqueous mixture --, therefor.

Claim 6, Column 8, Line 4, delete "composition" and insert -- aqueous mixture --, therefor.

Signed and Sealed this  
Fifth Day of March, 2024

Katherine Kelly Vidal  
*Director of the United States Patent and Trademark Office*